(12) United States Patent
O'Brien et al.

(10) Patent No.: US 8,101,023 B2
(45) Date of Patent: Jan. 24, 2012

(54) PREPARATION OF MEMBRANES USING SOLVENT-LESS VAPOR DEPOSITION FOLLOWED BY IN-SITU POLYMERIZATION

(75) Inventors: Kevin C. O'Brien, San Ramon, CA (US); Stephan A. Letts, San Ramon, CA (US); Christopher M. Spadaccini, Oakland, CA (US); Jeffrey C. Morse, Pleasant Hill, CA (US); Steven R. Buckley, Modesto, CA (US); Larry E. Fischer, Los Gatos, CA (US); Keith B. Wilson, San Ramon, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 70 days.

(21) Appl. No.: 12/792,013

(22) Filed: Jun. 2, 2010

(65) Prior Publication Data

US 2010/0236481 A1    Sep. 23, 2010

Related U.S. Application Data

(62) Division of application No. 11/486,669, filed on Jul. 14, 2006, now Pat. No. 7,754,281.

(60) Provisional application No. 60/700,650, filed on Jul. 18, 2005.

(51) Int. Cl.
*C23C 16/00* (2006.01)
*C23C 16/448* (2006.01)

(52) U.S. Cl. ........................................ 118/726; 118/715

(58) Field of Classification Search .................. 118/715, 118/726

See application file for complete search history.

(56) References Cited

U.S. PATENT DOCUMENTS

| 4,230,463 A | 10/1980 | Henis et al. |
| 4,575,385 A | 3/1986 | Brooks et al. |
| 5,215,554 A | 6/1993 | Kramer et al. |
| 5,591,250 A | 1/1997 | Stern et al. |
| 5,817,165 A | 10/1998 | Hachisuka et al. |
| 5,928,410 A | 7/1999 | Jois et al. |
| 6,264,747 B1 * | 7/2001 | Shaw et al. .................. 118/718 |

(Continued)

FOREIGN PATENT DOCUMENTS

JP    2001206947    7/2001

OTHER PUBLICATIONS

Salem, J.R., et al., "Solventless polyimide films by vapor deposition," J. Vac. Sci. Technol. A 4 (3), May/Jun. 1986, pp. 369-374.

(Continued)

*Primary Examiner* — Jeffrie R Lund
(74) *Attorney, Agent, or Firm* — Eddie E. Scott

(57) ABSTRACT

A system of fabricating a composite membrane from a membrane substrate using solvent-less vapor deposition followed by in-situ polymerization. A first monomer and a second monomer are directed into a mixing chamber in a deposition chamber. The first monomer and the second monomer are mixed in the mixing chamber providing a mixed first monomer and second monomer. The mixed first monomer and second monomer are solvent-less vapor deposited onto the membrane substrate in the deposition chamber. The membrane substrate and the mixed first monomer and second monomer are heated to produce in-situ polymerization and provide the composite membrane.

6 Claims, 3 Drawing Sheets

U.S. PATENT DOCUMENTS

| | | | |
|---|---|---|---|
| 6,383,258 B1 | 5/2002 | Simmons | |
| 6,497,747 B1 | 12/2002 | Ding et al. | |
| 7,329,696 B2* | 2/2008 | Ueno et al. | 523/221 |
| 7,754,281 B2* | 7/2010 | O'Brien et al. | 427/248.1 |
| 2002/0143094 A1 | 10/2002 | Conroy et al. | |
| 2005/0131081 A1* | 6/2005 | Ueno et al. | 516/77 |
| 2005/0244580 A1* | 11/2005 | Cok et al. | 427/248.1 |
| 2007/0020391 A1* | 1/2007 | O'Brien et al. | 427/248.1 |
| 2010/0236481 A1* | 9/2010 | O'Brien et al. | 118/725 |

OTHER PUBLICATIONS

O'Brien, K. C., et al., "Scale-Up of SLIP Process: Producing Nanoengineered Coatings at High Volumes to Meet Multi-Directorate Program Needs," cont'd.
Lawrence Livermore National Laboratory, Nov. 3, 2005, XP-002420857, 11 pgs.

* cited by examiner

PREPARATION OF MEMBRANES USING SOLVENT-LESS VAPOR DEPOSITION FOLLOWED BY IN-SITU POLYMERIZATION

CROSS-REFERENCE TO RELATED APPLICATIONS

This application is a Divisional of application Ser. No. 11/486,669 filed Jul. 14, 2006, now U.S. Pat. No. 7,754,281 entitled "Preparation of Membranes Using Solvent-Less Vapor Deposition Followed by In-Situ Polymerization". This application claims the benefit of U.S. Provisional Patent Application No. 60/700,650, filed Jul. 18, 2005, and titled "Preparation of Membranes Using Solvent-Less Vapor Deposition Followed by In-Situ Polymerization", which are incorporated herein by this reference.

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

1. Field of Endeavor

The present invention relates to membranes and more particularly to preparation of membranes using solvent-less vapor deposition followed by in-situ polymerization.

2. State of Technology

U.S. Pat. No. 5,817,165 for fluorine-containing polyimide gas separation membrane and method of manufacturing the same issued Oct. 6, 1998 to Hisao Hachisuka et al provides the following state of technology information: "Polyimide is known as a gas separation membrane material with excellent heat-resisting and anti-chemical properties due to its high glass transition point and rigid molecular chain structure. The manufacture of a thinner and more asymmetric separation membrane having a mechanical strength suitable for practical usage has been considered. When a polymer having a high separation factor is formed as a membrane on a proper porous supporting film, the membrane preferably should be 0.1 µm thick or less to obtain a practical permeability. As a result, the manufacturing process becomes complicated, the yield deteriorates and the cost is raised, and thus it is impractical for industrial use."

U.S. Pat. No. 6,497,747 for production and use of improved polyimide separation membranes issued Dec. 23, 2002 to Yong Ding et al provides the following state of technology information: "The use of polymeric membranes for gas separation applications is well documented in the art. The relationship between the polymeric structure and the gas separation properties has been extensively studied, see for example, W. J. Koros, Journal of Membrane Science, Volume 83, pp 1, 1993; L. M. Robeson, Journal of Membrane Science, Volume 62, pp 165, 1991; and L. M. Robeson, Polymer, Volume 35, pp 4970, 1994. It is well documented in the art that stiffening the polymeric backbone while simultaneously inhibiting chain packing can lead to improved gas permeability combined with an increase in gas selectivity for certain gas mixtures. Polyimides are examples of such rigid-rod polymers showing desirable gas separation properties, see for example, D. R. B. Walker and W. J. Koros, Journal of Membrane Science, Volume 55, page 99, 1991; S. A. Stern, Journal of Membrane Science, Volume 94, page 1, 1994; K. Matsumoto, P. Xu, Journal of Applied Polymer Science, Volume 47, page 1961, 1993. U.S. Pat. Nos. 4,705,540; 4,717,393; 4,717, 394; 5,042,993; and 5,074,891 disclose the preparation of such aromatic polyimide gas separation membranes. For practical industrial applications polymeric gas separation membranes are fabricated into an asymmetric or a composite configuration with thin separation layers. The membranes can be further configured into flat sheets or into hollow fibers. Although rigid-rod polyimides have excellent gas separation properties, they frequently can be dissolved only in aggressive organic solvents such as N-methyl-pyrrolidinone (NMP), N,N-dimethyl formamide (DMF), or phenols which makes it difficult to prepare composite membranes with ultrathin separation layers and can further cause environmental problems. For example, polyimide membranes have been fabricated from chlorophenol solutions as described in U.S. Pat. No. 4,440,643."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a system of fabricating a composite membrane from a membrane substrate using solvent-less vapor deposition followed by in-situ polymerization. A first monomer and a second monomer are directed into a mixing chamber in a deposition chamber. The first monomer and the second monomer are mixed in the mixing chamber providing a mixed first monomer and second monomer. The mixed first monomer and second monomer are solvent-less vapor deposited onto the membrane substrate in the deposition chamber. The membrane substrate and the mixed first monomer and second monomer are heated to produce in-situ polymerization and provide the composite membrane.

In one embodiment first monomer is dianhydride and the second monomer is diamine. In one embodiment the heating of the membrane substrate and the mixed first monomer and second monomer deposited on the membrane substrate is performed in the deposition chamber. In another embodiment the heating of the membrane substrate and the mixed first monomer and second monomer deposited on the membrane substrate is performed outside the deposition chamber.

In one embodiment the membrane substrate has a first side and a second side and the solvent-less vapor depositing the mixed first monomer and second monomer onto the membrane substrate in the deposition chamber deposits the mixed first monomer and second monomer onto the first side of the membrane substrate. In one embodiment the membrane substrate has a first side and a second side and the solvent-less vapor depositing the mixed first monomer and second monomer onto the membrane substrate in the deposition chamber deposits the mixed first monomer and second monomer onto the first side and the second side of the membrane substrate.

The present invention also provides an apparatus for fabricating a composite membrane using solvent-less vapor deposition followed by in-situ polymerization on a membrane substrate. The apparatus comprises a source of a first monomer, a source of a second monomer, a deposition chamber, a mixing chamber in the deposition chamber for mixing the first monomer and the second monomer and directing the mixed first monomer and second monomer onto the membrane substrate, and a heater for heating the mixed first monomer and second monomer and the membrane substrate.

In one embodiment the source of a first monomer is a source of dianhydride. In another embodiment the source of a second monomer is a source of diamine. In one embodiment the heater for heating the mixed first monomer and second monomer and the membrane substrate is located in the deposition chamber. In another embodiment the heater for heating the mixed first monomer and second monomer and the membrane substrate is located outside the deposition chamber.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
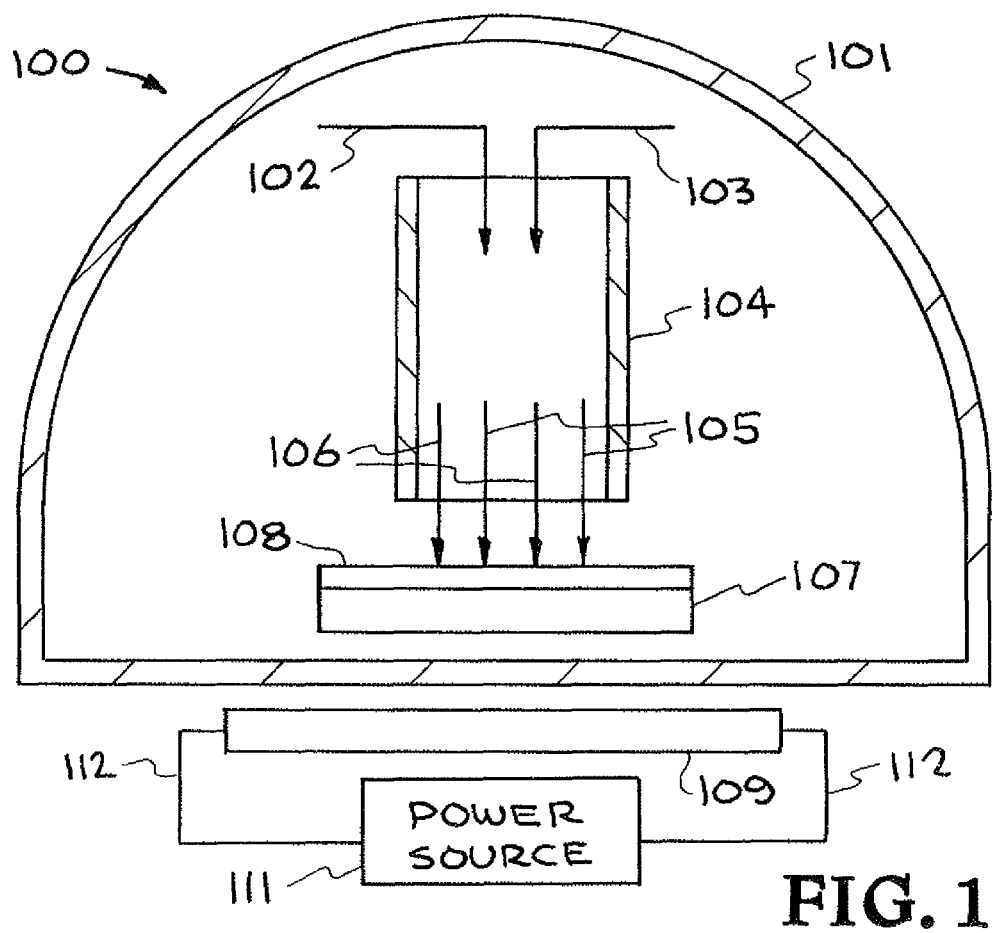
FIG. 1 illustrates one embodiment of a system constructed in accordance with the present invention.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Referring now to the drawings and in particular to FIG. 1, one embodiment of a system constructed in accordance with the present invention is illustrated. The system is designated generally by the reference numeral 100. The system is a system for the preparation of membranes using Solvent-Less vapor deposition followed by In-situ Polymerization (SLIP). FIG. 1 is a schematic of the SLIP process used to fabricate composite membranes.

Some of the structural elements of the system 100 are deposition chamber 101, mixing chamber 104, and heater 109. The heater 109 has a heating element 110. A power source provides power to the heater 109 through electrical connectors 112.

The preparation of membranes using solvent-less vapor deposition followed by in-situ polymerization system 100 is performed in the deposition chamber 101. Monomers dianhydride 102 and diamine 103 are injected into a mixing chamber 104. The Monomers dianhydride 102 and diamine 103 are then vapor deposited on substrate 107 as indicated by the arrows 105 for diamine and the arrows 106 for dianhydride. The deposited layer 108 is heated causing polyamic acid to form a polyimide. Polymerization of the deposited layer 108 occurs on the substrate 107 (in-situ) providing the membrane. Deposition occurs by a chemical vapor deposition process. No solvents are required for processing at any stage.

The solvent-less vapor deposition followed by In-Situ Polymerization (SLIP) system 100 offers a unique method to fabricate membranes. The system 100 reduces the number of steps involved in membrane fabrication, i.e., the polymer is directly polymerized in the solid state directly onto the other component of the composite membrane, as compared to polymerizing in solution and then casting onto the component. Unlike traditional membrane fabrication techniques, it does not require the formation of an asymmetric film (typically formed through the use of a solvent or the use of a solvent/non-solvent combination). As a result, there is no need to handle and dispose of solvents as well as remove residual solvent from the final film. The system 100 can be used to fabricate unique composite membranes that are very thin (less than 400 nm). These composite membranes exhibit properties that are an attractive combination of permeability and selectivity for gas separation applications.

Referring again to FIG. 1, the solvent-less vapor deposition followed by In-Situ Polymerization (SLIP) system 100 will be described in greater detail. Monomers (dianhydride 102 and diamine 103) or in other words precursors for the polyimide are vapor deposited onto the surface of the substrate 107 using the mixing nozzle 104. The monomers 102 and 103 are simultaneously deposited onto the substrate 107 and polymerize at the surface of the substrate (i.e., polymerize in situ) to form a polyamic acid deposited layer 108. The thickness of the coating 108 is adjusted by adjusting the deposition temperatures and the length of time the substrate is exposed. The coated substrate comprising substrate 107 and deposited layer 108 are then heated to cause the polyamic acid to form a polyimide. This heating step can either occur in the deposition chamber 101, or the sample can be removed from the chamber and heated separately. No solvents are required for processing at any stage.

The system 100 enables the design of membranes with improved transport properties that are better than either the substrate alone or the coating alone. For example, one approach is to use a substrate that has high permeabilities. This substrate is then coated with a thin layer of polyimides on one or both sides. The polyimides have been shown to exhibit high selectivities for gas separations. The thin polyimide coating is used to separate the gases, while the underlying substrate provides high permeability as well as good structural support. The substrate can be either a dense film or be microporous in nature. One example of a thin dense substrate that meets these requirements is perfluorodioxole.

Another use of the system 100 is to produce a porous substrate. If the pores of the substrate are small enough, the polyimide film can be applied to one or both sides and the film will bridge the pores. If the coating does not bridge the pores, techniques commonly used in the semiconductor industry could be employed to build up successive layers of SLIP coatings. These built up layers can then be designed to bridge the pores of the substrate.

Another use of the system 100 is to produce a substrate which is initially dense, and then later form pores in the substrate. For example, a dense sheet of ion tracked polycarbonate can be coated on one or both sides with a SLIP based coating. The coated sample is then exposed to an etchant in order to remove substrate material and create pores. In this case, the ion tracking in the substrate provides for channels that can later be etched out to create pores. The substrate is etched to form pores, but a thin film of the SLIP coating remains intact on one of the sides.

An advantages of fabricating membranes using the system 100 is that the properties of the final membrane (selectivity and permeability) can be simply adjusted by adjusting the thickness of the selective coating. Increasing the thickness of the SLIP coating produces a membrane that has higher selectivity and lower permeability. Decreasing the thickness of the SLIP coating produces a membrane that has higher permeability and lower selectivity. This provides a key variable that can be readily adjusted to design membranes for specific applications.

Figure 2:
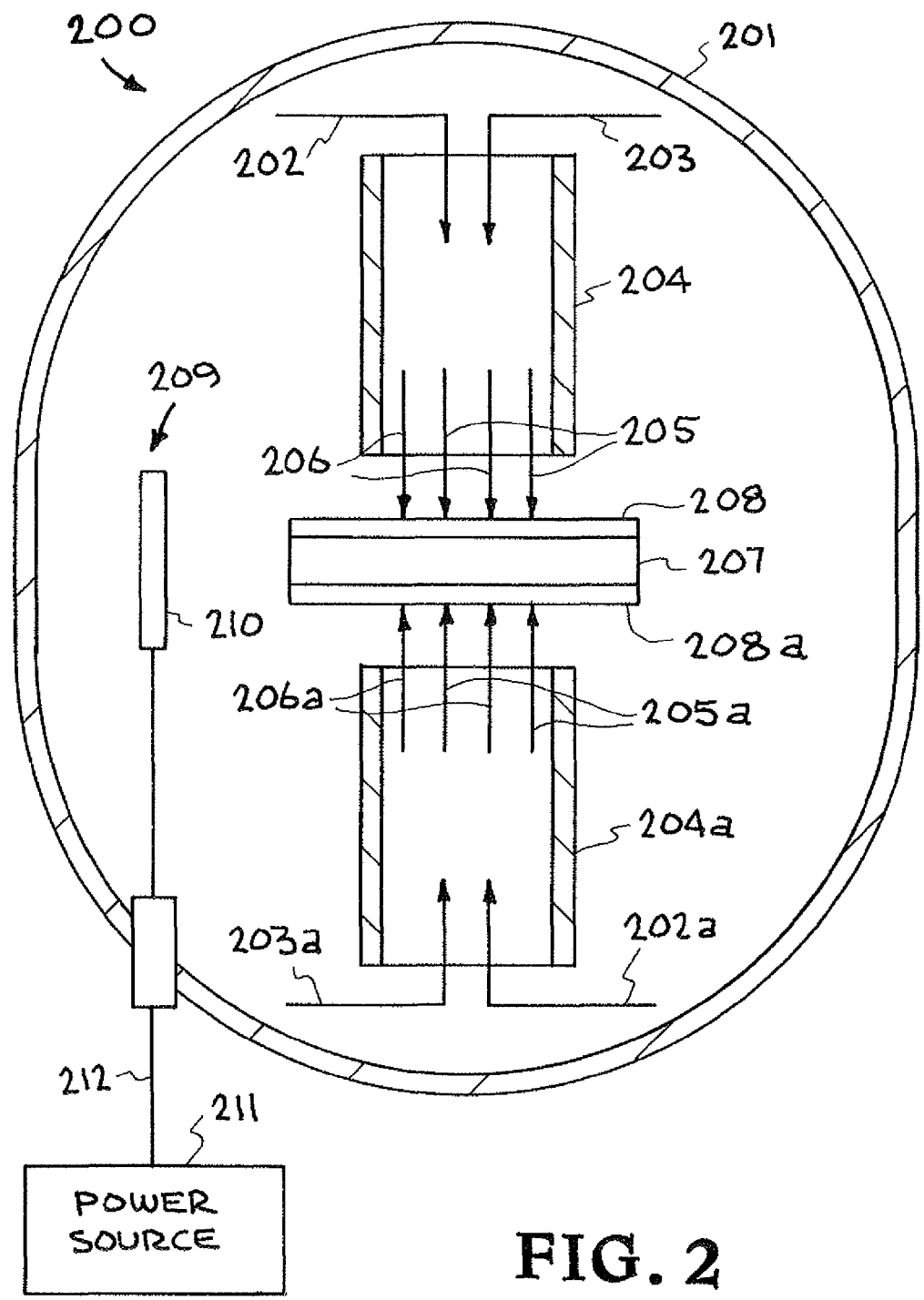
FIG. 2 illustrates another embodiment of a system constructed in accordance with the present invention.

Referring now to the drawings and in particular to FIG. 2, another embodiment of a system constructed in accordance with the present invention is illustrated. The system is designated generally by the reference numeral 200. The system is a system for the preparation of membranes using Solvent-Less vapor deposition followed by In-situ Polymerization (SLIP). FIG. 2 is a schematic of the SLIP process used to fabricate composite membranes. The system 200 provides deposited layers 208 and 208A on both sides of a substrate 207 to form a membrane.

Some of the structural elements of the system 200 are two deposition chambers 201 and 201A, two mixing chambers 204 and 204A, and heater 209. The heater 209 has a heating element 210. A power source provides power to the heater 209 through an electrical connector 212.

The preparation of a membrane using the solvent-less vapor deposition followed by in-situ polymerization system 200 is performed in the two deposition chambers 201 and 201A. Monomers dianhydride 202 and 202A and diamine 203 and 203A are injected into the two mixing chambers 204 and 204A respectively. The Monomers dianhydride 202 and 202A and diamine 203 and 203A are then vapor deposited on the two sides of the substrate 207 as indicated by the arrows 205 and 205A for diamine and the arrows 206 and 206A for dianhydride. The deposited layers 208 and 208A are heated causing polyamic acid to form a polyimide. Polymerization of the deposited layers 208 and 208A occurs on the substrate 207 (in-situ) providing the membrane. Deposition occurs by a chemical vapor deposition process. No solvents are required for processing at any stage.

The solvent-less vapor deposition followed by In-Situ Polymerization (SLIP) system 200 offers a unique method to fabricate membranes. The system 200 reduces the number of steps involved in membrane fabrication, i.e., the polymer is directly polymerized in the solid state directly onto the other component of the composite membrane, as compared to polymerizing in solution and then casting onto the component. Unlike traditional membrane fabrication techniques, it does not require the formation of an asymmetric film (typically formed through the use of a solvent or the use of a solvent/non-solvent combination). As a result, there is no need to handle and dispose of solvents as well as remove residual solvent from the final film. The system 200 can be used to fabricate unique composite membranes that are very thin (less than 400 nm. These composite membranes exhibit properties that are an attractive combination of permeability and selectivity for gas separation applications.

The system 200 enables the design of membranes with improved transport properties that are better than either the substrate alone or the coating alone. For example, one approach is to use a substrate that has high permeabilities. This substrate is then coated with a thin layer of polyimides on both sides. The polyimides have been shown to exhibit high selectivities for gas separations. The thin polyimide coating is used to separate the gases, while the underlying substrate provides high permeability as well as good structural support. The substrate can be either a dense film or be microporous in nature. One example of a thin dense substrate that meets these requirements is perfluorodioxole.

Another use of the system 200 is to produce a porous substrate. If the pores of the substrate are small enough, the polyimide film can be applied to one or both sides and the film will bridge the pores. If the coating does not bridge the pores, techniques commonly used in the semiconductor industry could be employed to build up successive layers of SLIP coatings. These built up layers can then be designed to bridge the pores of the substrate.

Another use of the system 200 is to produce a substrate which is initially dense, and then later form pores in the substrate. For example, a dense sheet of ion tracked polycarbonate can be coated on both sides with a SLIP based coating. The coated sample is then exposed to an etchant in order to remove substrate material and create pores. In this case, the ion tracking in the substrate provides for channels that can later be etched out to create pores. The substrate is etched to form pores, but a thin film of the SLIP coating remains intact on one of the sides.

An advantage of fabricating membranes using the system 200 is that the properties of the final membrane (selectivity and permeability) can be simply adjusted by adjusting the thickness of the selective coating. Increasing the thickness of the SLIP coating produces a membrane that has higher selectivity and lower permeability. Decreasing the thickness of the SLIP coating produces a membrane that has higher permeability and lower selectivity. This provides a key variable that can be readily adjusted to design membranes for specific applications.

Figure 3:
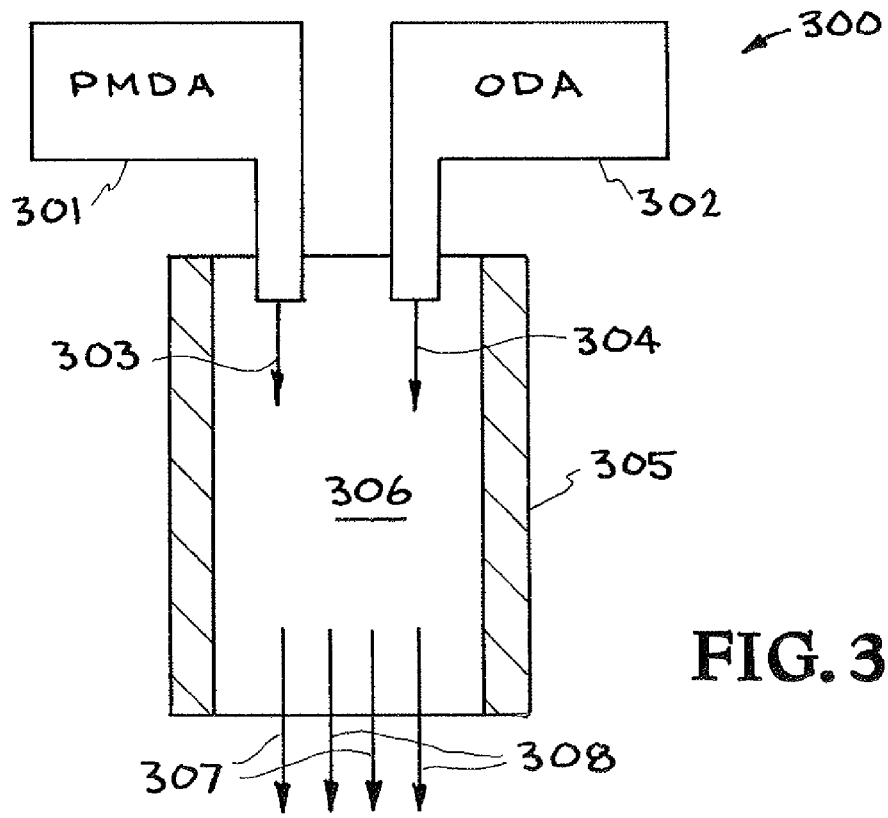
FIG. 3 shows an embodiment of the source of a first monomer, the source of a second monomer, and the mixing chamber system for the preparation of membranes using Solvent-Less vapor deposition followed by In-situ Polymerization (SLIP).

Referring now to FIG. 3, an embodiment of the source of a first monomer, the source of a second monomer, and the mixing chamber system for the preparation of membranes using Solvent-Less vapor deposition followed by In-situ Polymerization (SLIP) is shown. The embodiment is designated generally by the reference numeral 300. The source of a first monomer 301, the source of a second monomer 302, and the mixing chamber 306 are connected so as to mixing said first monomer and said second monomer and direct the mixed first monomer 303 and second monomer 304 onto the membrane substrate.

The source of a first monomer 302 is an example of a system that can be used as the source of monomers dianhydride 102, 202, and 202A illustrated in FIGS. 1 and 2. The source of a second monomer 303 is an example of a system that can be used as the source of monomer diamine 103, 203, and 203A illustrated in FIGS. 1 and 2. The mixing chamber 306 is an example of a mixing chamber that can be used as the mixing chambers 104, 204, and 204A illustrated in FIGS. 1 and 2.

The source of a first monomer 301 and the source of a second monomer 302 are close nozzle evaporators. The first monomer 303 and second monomer 304 are under vacuum in the source of a first monomer 301 and the source of a second monomer 302. The first monomer 303 and second monomer 304 are injected into the mixing chamber 306 and are vapor deposited onto the surface of the substrate using the mixing nozzle 305. This is illustrated by the arrows 307 representing the first monomer 303 and the arrows 308 representing the second monomer 304.

Applicants are conducting investigation, analysis, and research in developing different aspects of the present invention. The investigation, analysis, and research and some of the results of the investigation, analysis, and research being conducted by Applicants will now be described. Perfluorodioxole films (approximately 20 microns in thickness) are being used as substrates for the SLIP process such as that illustrated in FIGS. 1 and 2. The dianhydride being used for this process is pyromellitic dianhydride (PMDA), while the diamine used is oxydianiline (ODA). Dianhydride and diamine are being deposited on both sides of the perfluorodioxole substrate, then the coating and substrate is heated to 180° C. for 6 hours. The final polyimide produced by this reaction of the dianhydride and diamine is poly [N,N'-(phenoxyphenyl)-pyromellitimide] (i.e., PMDA-ODA). The thickness of the coating is varied by altering the time of deposition as shown in Table 1. Table 1 shows approximate deposition time and nominal thickness of coating.

TABLE 1

| Deposition time per side (secs) in SLIP apparatus | Thickness (nm) per side of SLIP coating |
| --- | --- |
| 9 | 100 |
| 18 | 200 |
| 36 | 400 |

The final membrane is then exposed to a number of individual gases in a standard gas permeation apparatus. The permeability of the film to each gas can then be calculated. The selectivity of the membrane for a given gas pair can then be calculated by taking the ratio of the permeabilities. The data is summarized in Table 2. Table 2 shows permeabilities (in Barrers) and selectivities (Ratio of Permeabilities).

TABLE 2

|  | N2 | CO2 | Selectivity CO2/N2 |
| --- | --- | --- | --- |
| Perfluorodioxole | 516 | 2934 | 5.69 |
| PMDA-ODA [data from reference 20] | 0.2 | 5 | 25.0 |
| SLIP 400 nm of PMDA-ODA coating per side on Perfluorodioxole | 1.29 | 31.6 | 24.5 |
| SLIP 200 nm of PMDA-ODA coating per side on Perfluorodioxole | 1.96 | 34.9 | 17.8 |
| SLIP 100 nm PMDA-ODA coating per side on Perfluorodioxole | 5.22 | 75 | 14.4 |

Figure 4:
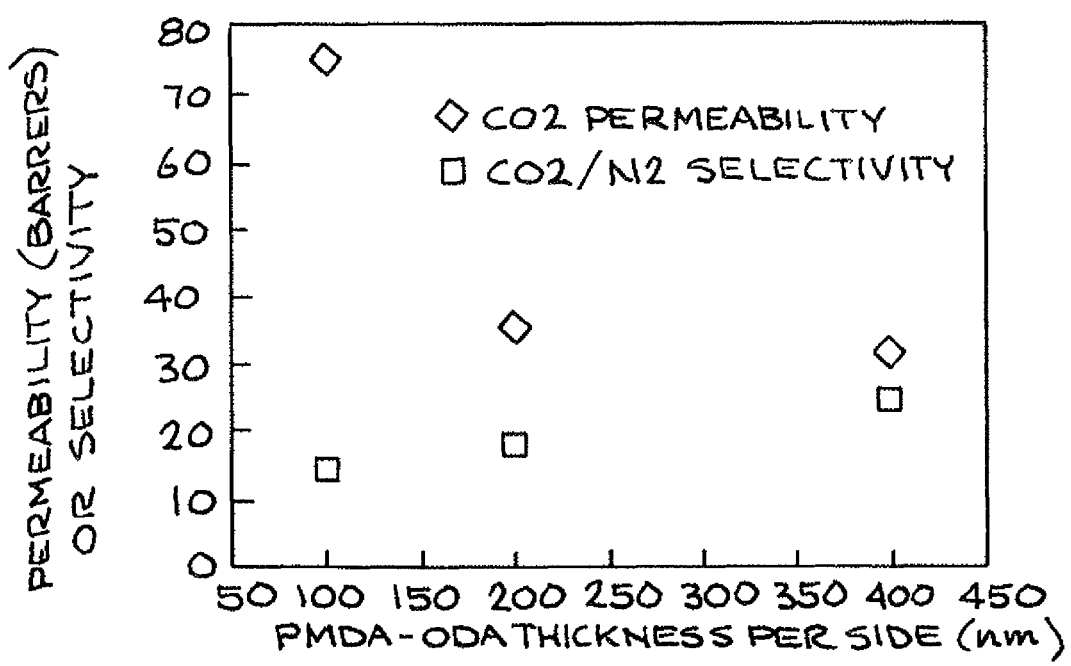
FIG. 4 is a graph showing the separation of $CO_2$ from $N_2$.

This data demonstrates that the system 10 enables a membrane to be tailored to the desired permeability and selectivity combination simply by varying the thickness of the SLIP coating. The combination of selectivity and permeability selected depends on the application. This is best illustrated by the data for the separation of $CO_2$ from $N_2$ shown in FIG. 4. FIG. 4 shows the influence of thickness of PMDA-ODA coating per side on $CO_2$ Permeability and $CO_2/N_2$ Selectivity.

An amplification factor can be defined to illustrate how the SLIP coated membranes exhibit improved permeabilities and selectivities relative to the coating alone and the substrate alone. For the separation of $CO_2$ from $N_2$ an amplification factor can be defined for the $CO_2$ permeabilities of the SLIP based membranes relative to the PMDA-ODA using the following relationship:

$$\text{Permeability Amplification Factor} = \frac{CO_2 \text{ permeabilities of the SLIP based membranes}}{CO_2 \text{ permeability of the PMDA-ODA film}}$$

Similarly, an amplication factor for $CO_2/N_2$ selectivity can be defined relative to the Perfluorodioxole substrate:

$$\text{Selectivity Amplification Factor} = \frac{CO_2/N_2 \text{ selectivity of the SLIP based membranes}}{CO_2/N_2 \text{ selectivity of the Perfluorodioxole film}}$$

Figure 5:
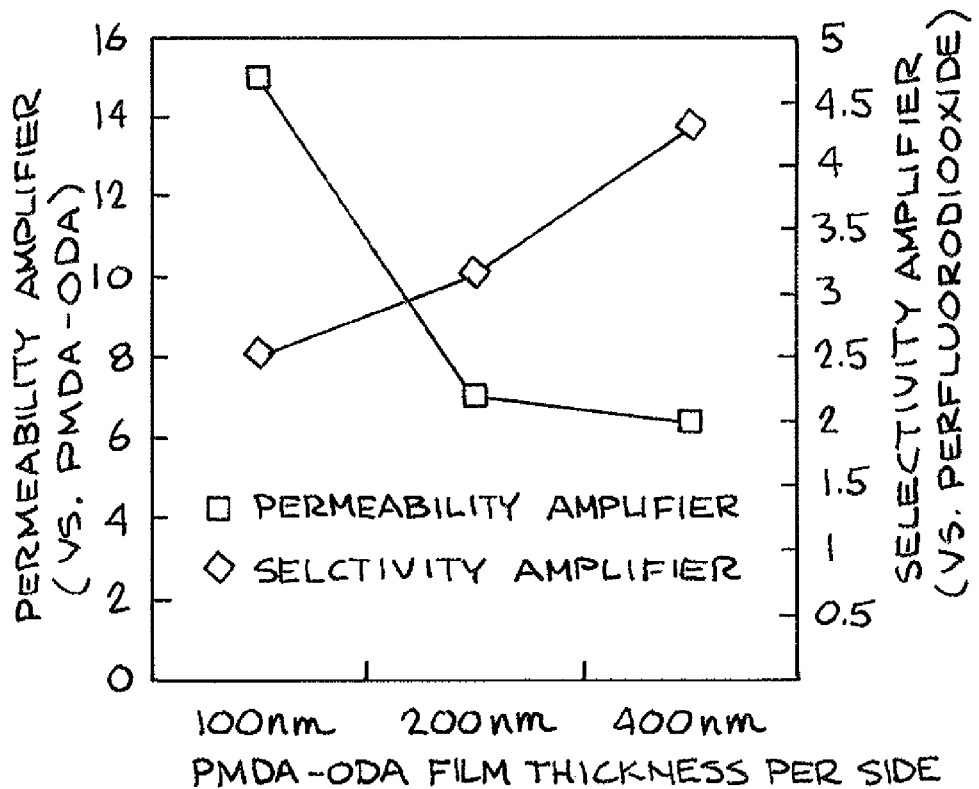
FIG. 5 is a graph showing permeability and selectivity amplification factors as a function of film thickness per side.

The permeability and selectivity amplification factors as a function of film thickness per side are plotted in FIG. 5. FIG. 5 shows the amplification. Factor for SLIP based films of PMDA-ODA on Perfluorodioxoie as a function of film thickness.

The system 10 offers over the following advantages:

Composite membranes fabricated using the system 10 offer the ability to overcome the selectivity and productivity tradeoff WITHOUT the need to form asymmetric membranes.

The system 10 does NOT require solvents, non-solvents, or coagulation baths. This simplifies the process and eliminates the handling of hazardous waste.

The system 10 is more flexible than the traditional asymmetric process. It does NOT require the formation of porous support structure based on the diffusion of solvents and non-solvents.

The system 10 does NOT require that the polyimide be soluble. This provides a great deal of flexibility in material selection.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. An apparatus for fabricating a composite membrane using solvent-less vapor deposition followed by in-situ polymerization on a membrane substrate, comprising:
    a source of a first monomer,
    a source of a second monomer,
    a deposition chamber,
    a mixing chamber in said deposition chamber for mixing said first monomer and said second monomer and directing said mixed first monomer and second monomer onto the membrane substrate, and
    a heater for heating said mixed first monomer and second monomer and the membrane substrate.

2. The apparatus for fabricating a composite membrane using solvent-less vapor deposition followed by in-situ polymerization on a membrane substrate of claim 1 wherein said source of a first monomer is a source of dianhydride.

3. The apparatus for fabricating a composite membrane using solvent-less vapor deposition followed by in-situ polymerization on a membrane substrate of claim 1 wherein said source of a second monomer is a source of diamine.

4. The apparatus for fabricating a composite membrane using solvent-less vapor deposition followed by in-situ polymerization on a membrane substrate of claim 1 wherein said heater for heating said mixed first monomer and second monomer and the membrane substrate is located in said deposition chamber.

5. The apparatus for fabricating a composite membrane using solvent-less vapor deposition followed by in-situ polymerization on a membrane substrate of claim 1 wherein said heater for heating said mixed first monomer and second monomer and the membrane substrate is located outside said deposition chamber.

6. The apparatus for fabricating a composite membrane using solvent-less vapor deposition followed by in-situ polymerization on a membrane substrate of claim 1 wherein said source of a first monomer is a close nozzle evaporator, said source of a second monomer is a close nozzle evaporator, and said mixing chamber in said deposition chamber for mixing said first monomer and said second monomer and directing said mixed first monomer and second monomer onto the membrane substrate includes a mixing nozzle.

\* \* \* \* \*